United States Patent
Matsumoto

(10) Patent No.: US 9,625,621 B2
(45) Date of Patent: Apr. 18, 2017

(54) OPTICAL SUBSTRATE, OPTICAL ELEMENT, OPTICAL ELEMENT BARREL, AND OPTICAL DEVICE

(71) Applicant: FUJIFILM Corporation, Tokyo (JP)

(72) Inventor: Nariya Matsumoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/868,838

(22) Filed: Sep. 29, 2015

(65) Prior Publication Data

US 2016/0091688 A1 Mar. 31, 2016

(30) Foreign Application Priority Data

Sep. 29, 2014 (JP) .................................. 2014-198452

(51) Int. Cl.
 *G02B 3/02* (2006.01)
 *G02B 7/02* (2006.01)
(52) U.S. Cl.
 CPC ............... *G02B 3/02* (2013.01); *G02B 7/022* (2013.01)

(58) Field of Classification Search
 CPC .................................. G02B 3/02; G02B 7/022
 See application file for complete search history.

(56) References Cited

U.S. PATENT DOCUMENTS

| | | | | |
|---|---|---|---|---|
| 1,792,171 A | * | 2/1931 | Kruening | G02B 7/021 359/829 |
| 2008/0088793 A1 | * | 4/2008 | Sverdrup | B29D 11/00009 351/159.73 |

FOREIGN PATENT DOCUMENTS

JP 2005-001319 1/2005

* cited by examiner

*Primary Examiner* — Joseph P Martinez
(74) *Attorney, Agent, or Firm* — Young & Thompson

(57) ABSTRACT

It is proposed an optical substrate of which at least one surface is combined with an optical member made of a material that is different from that of the optical substrate, so as to form an optical element, in which an edge face is formed on at least a portion of an outer circumferential face of the optical substrate, and the edge face is formed in a tapered shape that is centripetally reduced from a side of the surface combined with the optical member towards an opposite side thereof.

4 Claims, 7 Drawing Sheets

OPTICAL SUBSTRATE, OPTICAL ELEMENT, OPTICAL ELEMENT BARREL, AND OPTICAL DEVICE

CROSS-REFERENCE TO RELATED APPLICATIONS

This application is based on and claims priority under 35 USC 119 from Japanese Patent Application No. 2014-198452 filed on Sep. 29, 2014, the entire content of which is incorporated herein by reference.

BACKGROUND

1. Technical Field

The present invention relates to an optical substrate, an optical element, an optical element barrel, and an optical device.

2. Related Art

There is proposed a composite optical element that is made by forming a resin layer on a surface of an optical substrate formed of glass or the like and then shaping the resin layer into a desired optical face shape. In such a kind of composite optical element, a defective transfer of the optical face shape to the resin layer may occur due to the curing shrinkage of the resin. In a method of manufacturing the composite optical element described in JP-A-2005-001319, the resin layer is divided into a plurality of layers and then molded so as to suppress the defective transfer.

SUMMARY OF INVENTION

In the composite optical element, stress may act on the optical element due to the curing shrinkage of the resin, and the optical element may be distorted by the stress. Further, by the influence of the distortion, the outer circumferential face of the optical element may be inclined. The outer circumferential face of the optical element is generally a part that is engaged with a lens barrel that accommodates and holds the optical element therein. Hence, the inclination of the outer circumferential face may reduce the stability of the optical element within the lens barrel.

In view of above, illustrative aspects of the present invention are to provide an optical substrate, an optical element, and an optical element barrel which are capable of enhancing the stability of the optical element, which is formed by combining an optical member made of a material different from that of the optical substrate to a surface of the optical substrate, within a lens barrel, and to provide an optical device having the optical element barrel.

An aspect of the present invention provides an optical substrate of which at least one surface is combined with an optical member made of a material that is different from that of the optical substrate, so as to form an optical element, in which an edge face is formed on at least a portion of an outer circumferential face of the optical substrate, and the edge face is formed in a tapered shape that is centripetally reduced from a side of the surface combined with the optical member towards an opposite side thereof.

Another aspect of the present invention provides an optical element formed by combining the optical member to the optical substrate, in which the edge face of the optical substrate is parallel to an optical axis.

Another aspect of the present invention provides an optical element barrel including: the optical element; and a lens barrel engaged with the edge face of the optical substrate in the optical element to accommodate and hold the optical element therein.

Another aspect of the present invention provides an optical device including the optical element barrel.

According to any aspect of the present invention, it is possible to provide an optical substrate, an optical element, and an optical element barrel which are capable of enhancing the stability of the optical element, which is formed by combining an optical member made of a material different from that of the optical substrate to a surface of the optical substrate, within a lens barrel, and to provide an optical circumferential face device having the optical element barrel.

DESCRIPTION OF EMBODIMENTS

Figure 1:
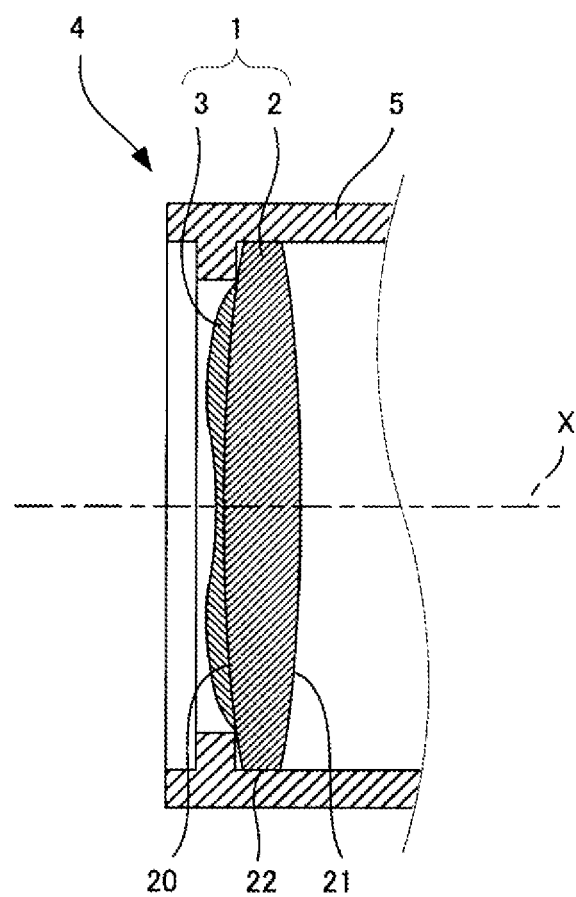
FIG. 1 is a view illustrating the configuration of an example of an optical element barrel having an optical element to explain an exemplary embodiment of the present invention.

FIG. 1 illustrates the configuration of an example of an optical element barrel having an optical element to explain an exemplary embodiment of the present invention.

An optical element 1 illustrated in FIG. 1 is formed by combining an optical member 3 to a surface 20 of an optical substrate 2. In the illustrated example, the optical element 1 is a lens, in of which one optical face formed by the optical member 3 is a free curved surface and the other optical face formed by a surface 21 of the other side of the optical substrate 2 is a convex spherical surface. Meanwhile, the combination of the shapes of both optical faces of the optical element 1 is not limited particularly, but may be an appropriate combination of various shapes such as a convex or concave spherical surface, a free curved surface and a plane.

The optical substrate 2 is formed of glass. Both the surfaces 20 and 21 of the optical substrate 2 are typically a convex or concave spherical surface or a plane according to the shape of the corresponding optical face of the optical element 1. In the illustrated example, both the surface 20 combined with the optical member 3 and the exposed surface 21 are formed as convex spherical surfaces.

The optical member 3 is made of a material different from that of the optical substrate 2. In this example, the optical member 3 is formed of resin. Meanwhile, the optical member 3 may be formed of glass that is different in composition from the optical substrate 2.

Further, an outer circumferential face 22 of the optical element 1, namely, the outer circumferential surface 22 of the optical substrate 2 with the optical member 3 being compositely coupled to the surface 20 is parallel to an optical axis X of the optical element 1.

An optical element barrel 4 is provided with a lens barrel 5, and is configured to accommodate and hold one or more optical elements 1 in the lens barrel 5. According to this example, the entire outer circumferential face 22 of the optical element 1 is an edge face, and the lens barrel 5 is engaged with the outer circumferential face (edge face) 22 of the optical element 1 so as to accommodate and hold the optical element 1.

As described above, the outer circumferential face 22 of the optical element 1 is parallel to the optical axis X of the optical element 1, and is in close contact with the entire inner circumferential face of the lens barrel 5. Thereby, the optical element 1 can be stably held in the lens barrel 5, and the shaking of the optical axis can be suppressed, so that the desired optical performance of the optical element barrel 4 can be obtained.

Figure 2A:
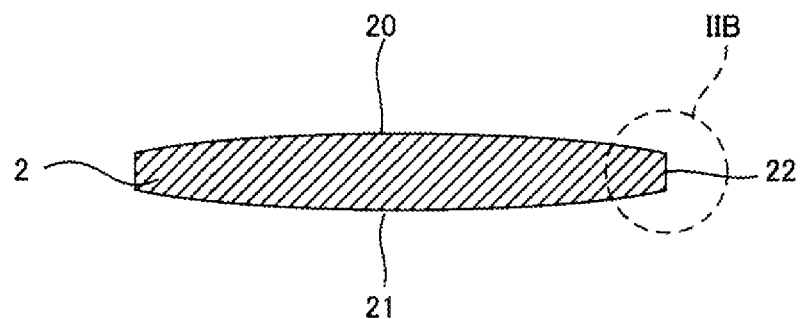
FIG. 2A is a view illustrating the configuration of an optical substrate of FIG. 1.
Figure 2B:
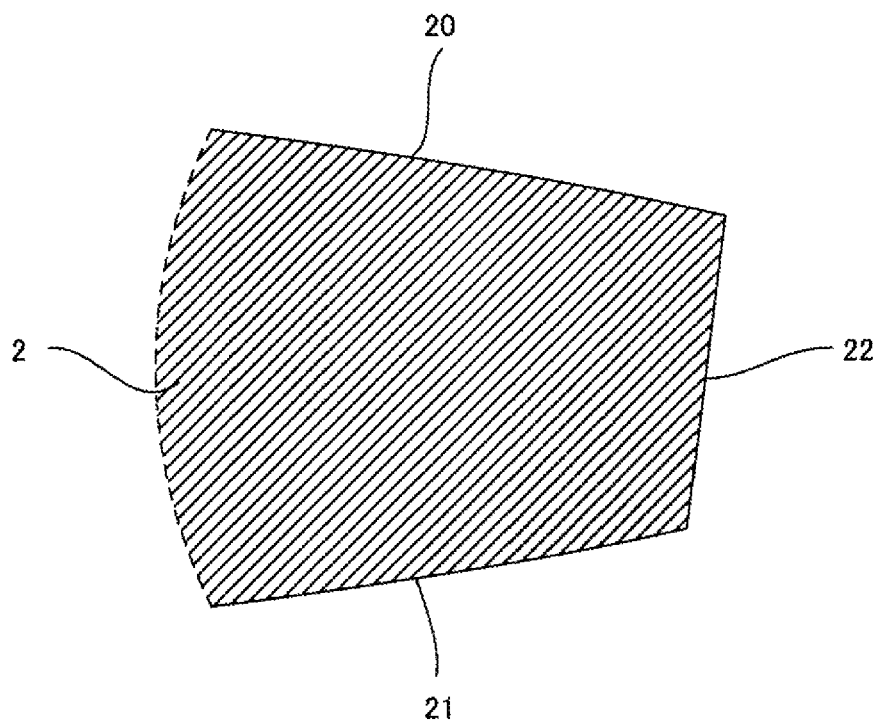
FIG. 2B is an enlarged view illustrating a portion surrounded by a dotted-line circle IIB of FIG. 2A.
Figure 3A:
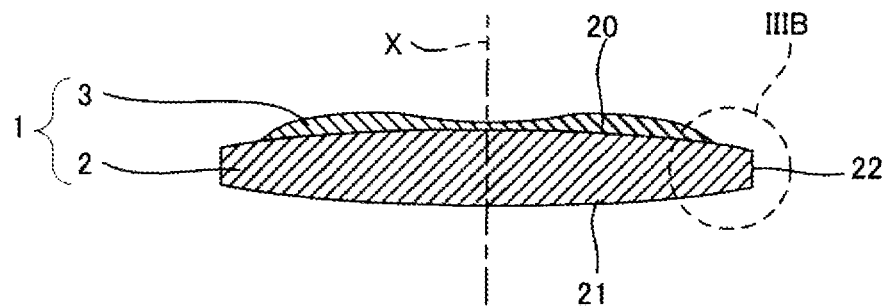
FIG. 3A is a view illustrating the configuration of the optical element of FIG. 1.
Figure 3B:
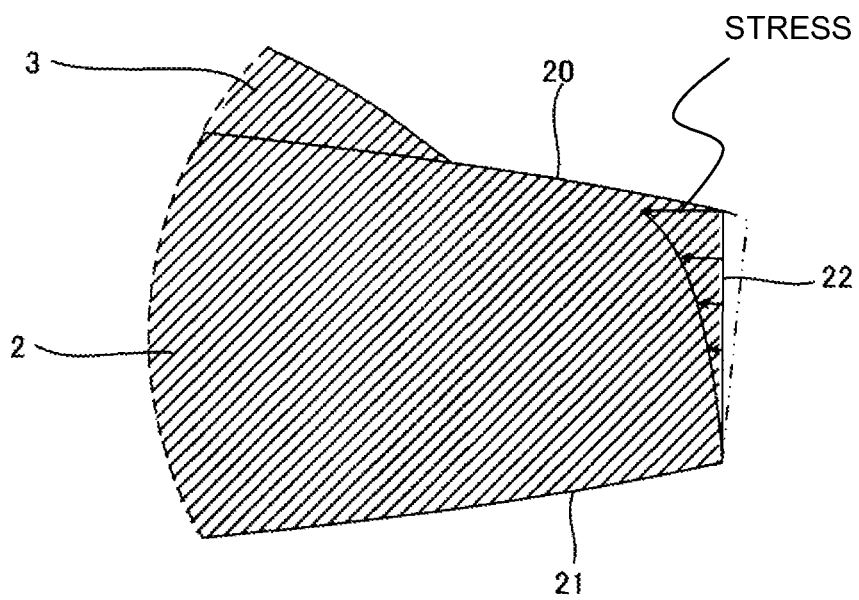
FIG. 3B is an enlarged view illustrating a portion surrounded by a dotted-line circle IIIB of FIG. 3A.
Figure 4A:
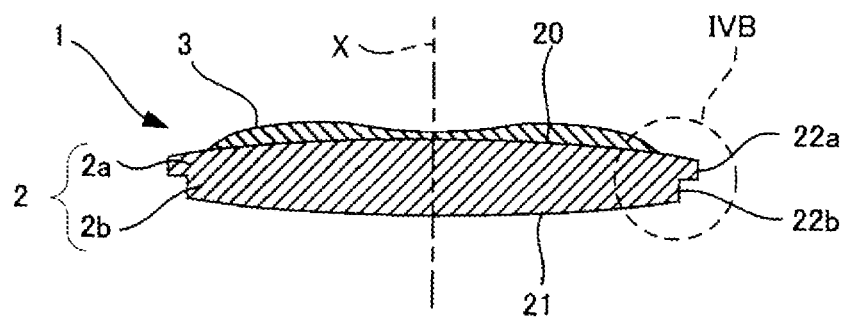
FIG. 4A is a view illustrating the configuration of a modification of the optical element of FIG. 1.
Figure 4B:
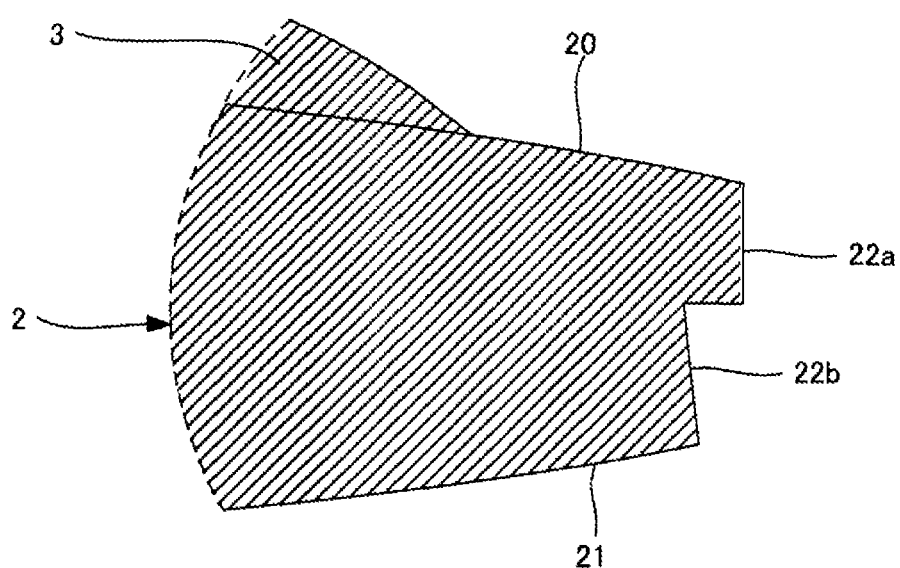
FIG. 4B is an enlarged view illustrating a portion surrounded by a dotted-line circle IVB of FIG. 4A.
Figure 5A:
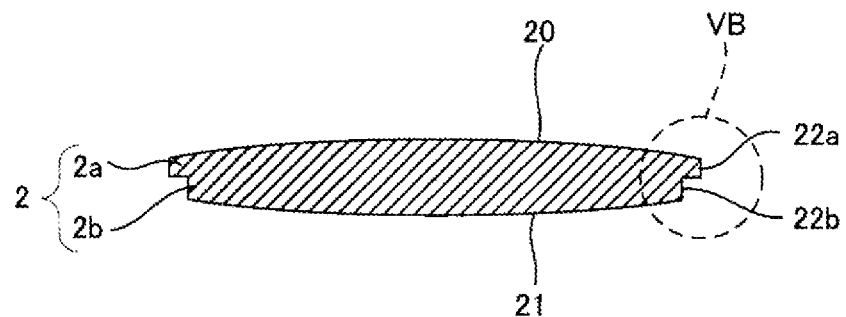
FIG. 5A is a view illustrating the configuration of an optical substrate of FIG. 4A.
Figure 5B:
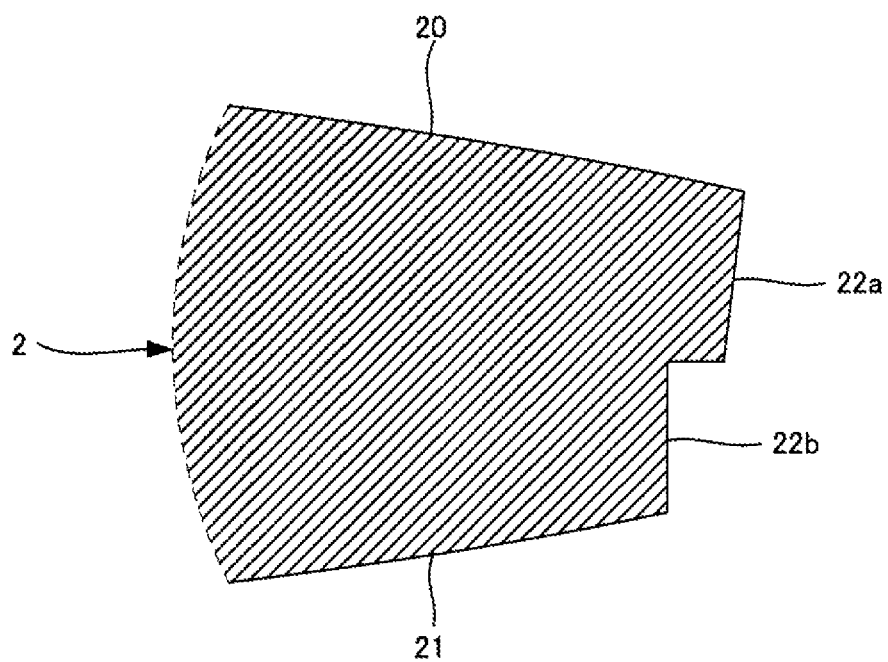
FIG. 5B is an enlarged view illustrating a portion surrounded by a dotted-line circle VB of FIG. 5A.

FIG. 2A illustrates the configuration of the optical substrate 2, and FIG. 2B is an enlarged view illustrating a portion surrounded by a dotted-line circle IIB of FIG. 2A. Further, FIG. 3A illustrates the configuration of the optical element 1, and FIG. 3B is an enlarged view illustrating a portion surrounded by a dotted-line circle IIIB of FIG. 3A.

In the state where the optical member 3 is not combined to the surface 20, the entire outer circumferential face 22 of the optical substrate 2 is formed in a tapered shape that is centripetally reduced from the surface 20 side combined with the optical member 3 toward the opposite surface 21 side.

The optical member 3 is formed in a state where it is bonded to the surface 20 by forming a resin layer on the surface 20 of the optical substrate 2, transferring a desired optical face shape to the resin layer using a shaping mold, and then curing the resin layer.

Due to the curing shrinkage occurring when the resin layer forming the optical member 3 is cured, centripetal stress acts on the optical substrate 2. The stress increases toward the surface 20 combined with the optical member 3. Therefore, the shrinkage of the surface 20 combined with the optical member 3 becomes larger than that of the surface 21, thus causing the outer circumferential face 22 to be inclined. The inclination angle of the outer circumferential face 22 resulting from the stress is typically about 0.2° to about 0.5°.

With respect to the inclination of the outer circumferential face 22 resulting from the stress, the outer circumferential face 22 of the optical substrate 2 in the state where the optical member 3 is not combined to the surface 20 is formed in a tapered shape that is centripetally reduced from the surface 20 side toward the surface 21 side. Thus, in the state where the optical member 3 is combined to the surface 20, the inclination of the outer circumferential face 22 resulting from the stress is offset so that the outer circumferential face 22 becomes parallel to the optical axis X of the optical element 1. For example, as illustrated in FIG. 3B, the outer circumferential face 22 becomes from a state indicated by two-dot chain line to a state indicated by solid line.

Herein, the meaning of being "parallel" to the optical axis X is intended to include a case where an angle formed with the optical axis X is 0.1° or less.

The inclination of the outer circumferential face 22 resulting from the stress is also affected by the thickness or the outer diameter of the optical element 1. As the optical element 1 becomes flatter, the inclination tends to be more remarkable. In the case where $3<\phi/d<100$ assuming that the thickness of the optical element 1 on the optical axis X is d [mm] and the outer diameter thereof is $\phi$ [mm], it is particularly useful to form the outer circumferential face 22 of the optical substrate 2 in a tapered shape so as to offset the inclination of the outer circumferential face 22 resulting from the stress, as described above. As approaching the lower limit of the conditional expression, the lens shape becomes similar to a block shape, so that a proportion of a range in which the edge face is inclined by the influence of stress is reduced. Thus, the contribution ratio of the influence of the stress decreases. On the other hand, as approaching the upper limit, as for the lens shape, a proportion of a range in which the edge face is inclined by the influence of stress increases and the influence of the bending of the entire lens is also added. Thus, the contribution ratio of the influence of the stress increases. Further, as the value of $\phi/d$ increases, namely, the lens becomes flatter, the power of the lens is also small and a merit of combining the surface also decreases. Therefore, a value less than 100 is suitable as the upper limit of $\phi/d$.

The tapered edge face may be formed on at least a portion of the outer circumferential face 22 of the optical substrate 2, and the optical member 3 may be combined to the surface 20 such that the edge face is parallel to the optical axis X of the optical element 1. When the edge face which becomes parallel to the optical axis X made to come into close contact with the inner circumferential face of the lens barrel 5, the optical element 1 can be stably held in the lens barrel 5.

In the example illustrated in FIGS. 4A to 5B, the optical substrate 2 includes a large diameter portion 2a at the side of the surface 20 combined with the optical member 3, and a small diameter portion 2b at the side of the other surface 21. Further, the outer circumferential face 22a of the large diameter portion 2a is formed in a tapered shape that is centripetally reduced from the surface 20 side towards the surface 21 side, and is formed as the edge face.

In this case, as the optical member 3 is combined to the surface 20, the edge face 22a becomes parallel to the optical axis X of the optical element 1, so that the edge face 22a is brought into close contact with the inner circumferential face of the lens barrel 5 when the optical element 1 is accommodated in the lens barrel 5 (see FIG. 1). Thereby, the optical element 1 may be stably held in the lens barrel 5. Since the outer circumferential face 22b of the small diameter portion 2b does not contribute to the engagement with the lens barrel 5, it may have any shape.

Figure 6:
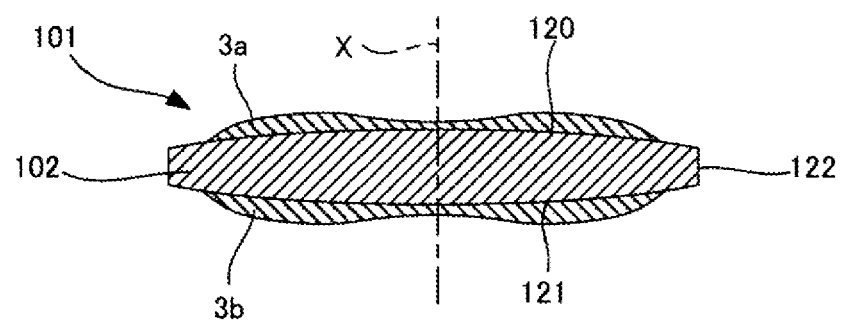
FIG. 6 is a view illustrating the configuration of another example of an optical element to explain an exemplary embodiment of the present invention.
Figure 7A:
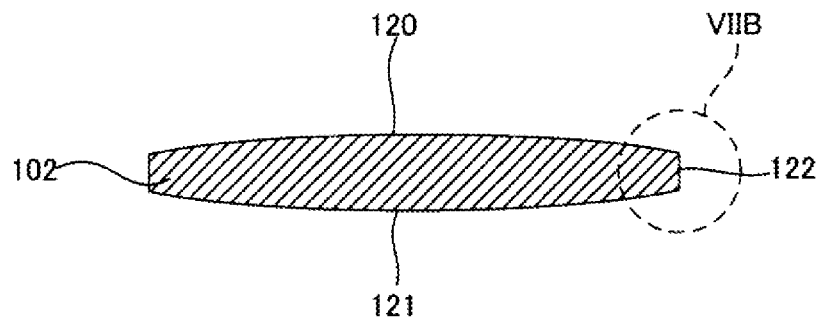
FIG. 7A is a view illustrating the configuration of an optical substrate of FIG. 6.

FIG. 6 illustrates the configuration of another example of an optical element to explain an exemplary embodiment of the present invention. Further, FIG. 7A illustrates the configuration of an optical substrate of FIG. 6, and FIG. 7B is an enlarged view illustrating a portion surrounded by a dotted-line circle VIIB of FIG. 7A.

The optical element 101 illustrated in FIG. 6 is formed by combining an optical member 3a to a surface 120 of an optical substrate 102 and combining an optical member 3b to a surface 121 of the other side thereof as well. An outer circumferential face 122 of the optical element 101, namely, the outer circumferential face 122 of the optical element 101, in the state where the optical members 3a and 3b are combined to the surfaces 120 and 121, respectively, is parallel to an optical axis X of the optical element 101.

Figure 7B:
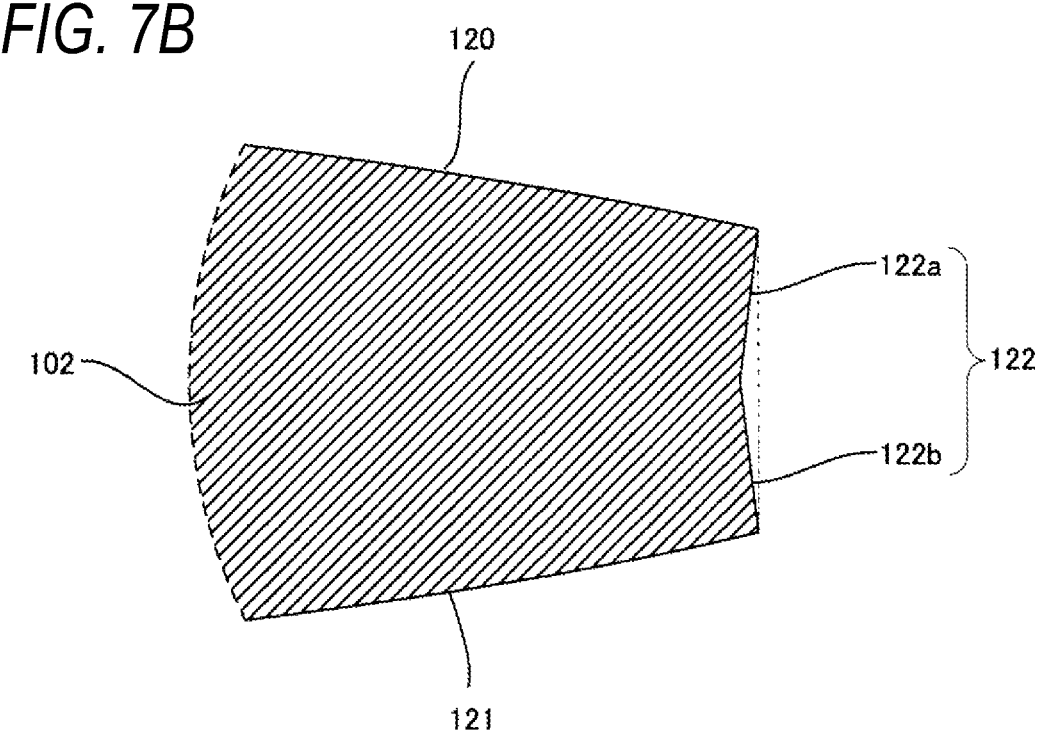
FIG. 7B is an enlarged view illustrating a portion surrounded by a dotted-line circle VIIB of FIG. 7A.

As illustrated in FIG. 7B, in the state where the optical members 3a and 3b are not combined to the surfaces 120 and 121, the outer circumferential face 122a at the surface 120 side of the optical substrate 102 is formed in a tapered shape that is centripetally reduced from the surface 120 side towards the opposite surface 121 side, and is formed as an edge face. Further, the outer circumferential face 122b at the surface 121 side is formed in a tapered shape that is centripetally reduced from the surface 121 towards the opposite surface 120 side, and is formed as an edge face.

As the optical member 3a is combined to the surface 120, larger centripetal stress acts on the surface 120 side of the optical substrate 102. In addition, as the optical member 3b is combined to the surface 121, larger centripetal stress acts on the surface 121 side of the optical substrate 102. The stress causes the outer circumferential face 122 to be inclined. However, the inclination of the outer circumferential face 122 resulting from the stress is offset by the tapered shape of each of the edge faces 122a, 122b, so that edge faces 122a, 122b become parallel to the optical axis X of the optical element 101.

As an example of the optical device having the above-mentioned optical element barrel 4, in an image capturing apparatus further including an image capturing element such as a CCD (Charge Coupled Device) image sensor or a CMOS (Complementary Metal Oxide Semiconductor) image sensor, the optical element 1 is stably held in the lens barrel 5 so that the shaking of the optical axis is suppressed. Therefore, the optical element barrel 4 is able to enhance the quality of an image obtained by the image capturing element.

Further, as another example of the optical device having the above-mentioned optical element barrel 4, in a projection apparatus further including an image display element such as an LCD (Liquid Crystal Display) panel, the optical element 1 is stably held in the lens barrel 5 so that the shaking of the optical axis is suppressed. Therefore, the optical element barrel 4 is able to enhance the quality of an image projected by the image display element.

Meanwhile, the optical members 3, 3a, 3b may be bonded to the surfaces of the optical substrates 2, 102 in a previously shaped state and thereby combined to the surfaces of the optical substrates 2, 102. Due to a linear expansion difference between the optical substrates 2, 102 and the optical members 3, 3a, 3b, the same effect may be obtained in the case that larger centripetal stress acts on the optical substrates 2, 102 in the surfaces to which the optical members 3, 3a, 3b are combined.

As described above, an optical substrate disclosed herein is an optical substrate, of which at least one surface is combined an optical member, made of a material different from that of the optical substrate so as to form an optical element. An edge face is formed on at least a portion of an outer circumferential face of the optical substrate in a tapered shape that is centripetally reduced from a side of the surface combined with the optical member towards an opposite side thereof.

Further, in an optical element disclosed herein, the edge face of the optical substrate is parallel to the optical axis.

Further, in the optical element disclosed herein, a conditional expression of $3<\phi/d<100$ is satisfied where a thickness of the optical element on the optical axis is d [mm] and an outer diameter of the optical element is $\phi$ [mm].

Furthermore, the optical element disclosed herein is a lens.

Further, the optical element barrel disclosed herein includes a lens barrel that is engaged with the edge face of the optical substrate of the optical element to accommodate and hold the optical element therein.

Furthermore, an optical device disclosed herein includes the optical element barrel.

What is claimed is:

1. An optical element comprising:
   a substrate of which at least one surface is combined with an optical member made of a material that is different from that of the optical substrate,
   wherein an edge face is formed on at least a portion of an outer circumferential face of the optical substrate,
   wherein the edge face is formed in a tapered shape that is centripetally reduced from a side of the surface combined with the optical member towards an opposite side thereof,
   wherein the edge face of the optical substrate is parallel to an optical axis, and
   wherein a conditional expression of $3<\phi/d<100$ is satisfied where a thickness of the optical element on the optical axis is d millimeter and an outer diameter of the optical element is $\phi$ millimeter.

2. The optical element of claim 1, wherein the optical element is a lens.

3. An optical element barrel comprising:
   the optical element of claim 1; and
   a lens barrel engaged with the edge face of the optical substrate in the optical element to accommodate and hold the optical element therein.

4. An optical device comprising the optical element barrel of claim 3.

* * * * *